US007707708B2

(12) United States Patent
Douglas et al.

(10) Patent No.: US 7,707,708 B2
(45) Date of Patent: May 4, 2010

(54) APPARATUS FOR MAKING A TUBULAR COMPOSITE STRUCTURE

(75) Inventors: Alan Richard Douglas, Chula Vista, CA (US); Gabriel Joseph Gutierrez, Corona, CA (US); Mark Alan Ramsey, Chula Vista, CA (US); Steven Mark Ranum, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 1260 days.

(21) Appl. No.: 11/230,533

(22) Filed: Sep. 21, 2005

(65) Prior Publication Data

US 2007/0062022 A1    Mar. 22, 2007

(51) Int. Cl.
  *B23P 19/00* (2006.01)
  *A01J 21/00* (2006.01)
(52) U.S. Cl. .......................................... 29/718; 425/182
(58) Field of Classification Search .................... 29/458, 29/527.1, 700, 718; 425/182, 186, 330, 441, 425/451.5
See application file for complete search history.

(56) References Cited

U.S. PATENT DOCUMENTS

| | | | |
|---|---|---|---|
| 1,835,986 A | 12/1931 | Heston | |
| 2,586,300 A | 2/1952 | Campbell | |
| 3,768,954 A | 10/1973 | Marsh et al. | |
| 4,122,672 A | 10/1978 | Lowrie | |
| 4,177,032 A | 12/1979 | Selden | |
| 4,278,490 A | 7/1981 | Pistole et al. | |
| 4,288,277 A | 9/1981 | Siilats | |
| 4,436,574 A | 3/1984 | Long et al. | |
| 4,462,787 A | 7/1984 | Bogardus et al. | |

(Continued)

FOREIGN PATENT DOCUMENTS

DE    1 262 570    3/1968

(Continued)

OTHER PUBLICATIONS

Partial European Search Report dated Feb. 5, 2007, Application No. 06019100.4-1253.

(Continued)

*Primary Examiner*—John C Hong
(74) *Attorney, Agent, or Firm*—Womble Carlyle

(57) ABSTRACT

A tool for making a composite tubular structure, such as the inner skin of an acoustic liner, includes a base on which are mounted a plurality of sectors, each having an outer panel provided with a predetermined shaped surface. The predetermined shaped surface corresponds to a portion of the contour of the tubular structure to be formed. At least one of the sectors is fixed relative to the base while the remaining sectors are movable in a radial direction and separable from all the other sectors. The sectors are provided with air bearings to facilitate movement along a radial direction. Splice plates are used to form a joint between the outer panels of adjacent sectors. After composite material is applied on the outer panels, a vacuum bag is formed to surround the composite material and also the joint areas on the inner surface of the tool. The entire tool may be placed in an autoclave for curing. The thus-formed composite tubular structure may be remounted on the tool for bonding to additional exterior layers.

15 Claims, 14 Drawing Sheets

U.S. PATENT DOCUMENTS

| | | |
|---|---|---|
| 4,610,422 A | 9/1986 | Kraiss |
| 4,861,247 A | 8/1989 | Schimanek |
| 5,022,845 A | 6/1991 | Charlson et al. |
| 5,228,374 A | 7/1993 | Santeramo |
| 5,266,137 A | 11/1993 | Hollingsworth |
| 5,768,778 A | 6/1998 | Anderson et al. |
| 6,123,170 A | 9/2000 | Porte et al. |
| 6,458,309 B1 | 10/2002 | Allen et al. |
| 6,755,280 B2 | 6/2004 | Porte et al. |
| 7,125,237 B2 | 10/2006 | Buge et al. |
| 2003/0164438 A1 | 9/2003 | Meinrad |
| 2004/0065775 A1 | 4/2004 | Buge et al. |
| 2006/0225265 A1 | 10/2006 | Burnett et al. |
| 2008/0031996 A1 | 2/2008 | Mamada |

FOREIGN PATENT DOCUMENTS

| | | |
|---|---|---|
| DE | 1 504 597 | 5/1969 |
| DE | 2 259 690 | 6/1974 |
| DE | 23 52 373 | 4/1975 |
| EP | 0184759 A2 | 3/1958 |
| WO | WO 92/14672 | 9/1992 |

OTHER PUBLICATIONS

Extended EP Search Report in counterpart appl'n. EP 06019100.4.
American Solving, Inc., "Rig Set Modular Air Bearing System" [online], retrieved from the Internet: http://www.solvinginc.com/rig_set_modular_air_bearing_syst.htm>, [Retrieved on Mar. 15, 2007 by the EPO]; p. 1-p. 2.

APPARATUS FOR MAKING A TUBULAR COMPOSITE STRUCTURE

CROSS REFERENCE TO RELATED APPLICATIONS

None.

BACKGROUND OF THE INVENTION

The present invention is related to a method and apparatus for making tubular composite articles, such as an acoustic liner for an aircraft nacelle.

An acoustic inlet barrel for a nacelle inlet may comprise a number of layers, including a perforated inner skin, an acoustic core, and an impervious outer skin. Typically, the inner skin is formed from sectors that are bolted together at axially extending seams. Ideally, however, the perforated skin has no internal seams or other features which may degrade the acoustic performance of the barrel.

U.S. Published Patent Application No. 2004/0065775 discloses a tool for molding an air intake, and more specifically for forming a one-piece inner skin having no internal seams. The tool comprises a mandrel having four arcuate sectors, a fixed sector that does not move during normal operation to the tool, two movable articulated sectors each hingedly connected to either side of the first sector; and a movable key sector which is independent from the other sectors and insertable between the articulated sectors. By virtue of the hinges, the articulated sectors remain connected to the fixed sector and cannot be separated therefrom. Locks are provided to secure the key sector to the articulated sectors. When in the molding position, the four sectors together define, by their external surfaces, a continuous surface corresponding to the internal surface of an air intake. A control device, disconnectable from the mandrel, may be used to adjust the movable sectors between a molding position and an non-molding position.

SUMMARY OF THE INVENTION

In one aspect, the present invention is directed to a tool for making a composite tubular structure, the tool being adjustable between a molding position and a non-molding position. Such a tool comprises a base; and a plurality of sectors mounted on the base, the plurality of sectors including at least one fixed sector that is fixed relative to the base and at least two movable sectors, each of the movable sectors being movable in a radial direction and separable from all the other sectors.

The tool may further comprise splice plates positioned between adjacent sectors, when the tool is in the molding position. The splice plates may have a T-shaped cross-section, and are configured to maintain alignment of adjacent sectors. The outer surfaces of the splice plates may form a portion of an outer contour of the tool and maintain a maximum step difference along side edges of adjacent sectors that is less than 0.05 inches.

Each of the movable sectors may rest on at least one air bearing to facilitate movement in said radial direction; the at least one air bearing may comprise a flat portion of a movable sector. The tool may further comprise a nozzle attached to said movable sector and connectable to a compressed air source to thereby supply air to said at least one air bearing.

The tool may further comprise at least one removable hand wheel operatively connected to a corresponding removable shaft, wherein turning the hand wheel moves a corresponding sector in the radial direction. The at least one removable hand wheel and the removable shaft may be mounted on separate hinged blocks. The sectors and the hinged blocks may be made from a same material so that they have a common coefficient of thermal expansion.

The tool may further comprise a pair of cutouts formed in the upper facing corners of adjacent sectors, the cutouts merging to form a notch, when the tool is in the molding position.

The tool may have a total of four sectors, one fixed sector and three movable sectors.

In another aspect, the present invention is directed to a method for molding a tubular composite inner skin for an acoustic inner barrel. The inventive method comprises providing a tool that is adjustable between a molding position and a non-molding position, the tool comprising a base and a plurality of sectors mounted on the base, the plurality of sectors including at least one fixed sector that is fixed relative to the base and at least two movable sectors, each of the movable sectors being movable in a radial direction and separable from all the other sectors; adjusting the movable sectors until the tool is in the molding position; applying composite material on an outer surface of each sector; curing the composite material to form an inner skin; and removing the inner skin from the outer surface.

In still another aspect, the present invention is directed to a tool for making a composite tubular structure, the tool being adjustable between a molding position and a non-molding position. The tool comprises a base, a plurality of sectors mounted on the base, the plurality of sectors including at least one fixed sector that is fixed relative to the base and at least two movable sectors. Each of the movable sectors is movable in a radial direction and separable from all the other sectors, each of the movable sectors rests on at least one air bearing to facilitate movement along an upper surface of said base, and each of the movable sectors is operatively connected to a removable hand wheel operatively connected to a corresponding removable shaft, wherein turning the hand wheel moves a corresponding sector. The tool also includes a plurality of splice plates, with one splice plate positioned between adjacent sectors, when the tool is in the molding position.

In still another aspect, the present invention is directed to a tool for making a composite tubular structure, the tool being adjustable between a molding position and a non-molding position. The tool comprises a base, a plurality of sectors mounted on the base, the plurality of sectors including at least one fixed sector that is fixed relative to the base and at least two movable sectors; and a plurality of splice plates, with one splice plate positioned between adjacent sectors, when the tool is in the molding position.

The splice plates may have a T-shaped cross-section, and are configured to maintain alignment of adjacent sectors. The outer surfaces of the splice plates may form a portion of an outer contour of the tool and maintain a maximum step difference along side edges of adjacent sectors that is less than 0.05 inches.

In yet another aspect, the present invention is directed to a tool for making a composite tubular structure, the tool being adjustable between a molding position and a non-molding position. The tool comprises a base, and a plurality of sectors mounted on the base, the plurality of sectors including at least one fixed sector that is fixed relative to the base and at least two movable sectors; wherein each of the movable sectors rests on an air bearing to facilitate movement along an upper surface of said base.

In yet another aspect, the present invention is directed to a tool for making a composite tubular structure, the tool being adjustable between a molding position and a non-molding position. The tool comprises a base, and a plurality of sectors mounted on the base, the plurality of sectors including at least one fixed sector that is fixed relative to the base and at least two movable sectors, wherein each movable sector is operatively connected to a removable hand wheel operatively connected to a corresponding removable shaft, wherein turning the hand wheel moves a corresponding sector.

In yet another aspect, the present invention is directed to method for molding a tubular composite inner skin for an acoustic inner barrel. The inventive method comprises providing a tool that is adjustable between a molding position and a non-molding position, the tool comprising a base and a plurality of sectors mounted on the base, the plurality of sectors including at least one fixed sector that is fixed relative to the base and at least two movable sectors, all of the movable sectors being movable in a radial direction relative to a center of the base; placing a tubular composite inner skin over the tool; positioning an acoustic core over the inner skin and bonding the acoustic core thereto; positioning an outer skin over the acoustic core and bonding the outer skin thereto; and removing the bonded inner skin/core/outer skin composite structure from the tool.

DETAILED DESCRIPTION OF THE INVENTION

The contents of aforementioned U.S. published Patent Application No. 2004/0065775 are incorporated by reference to the extent necessary to understand the present invention.

Figure 1:
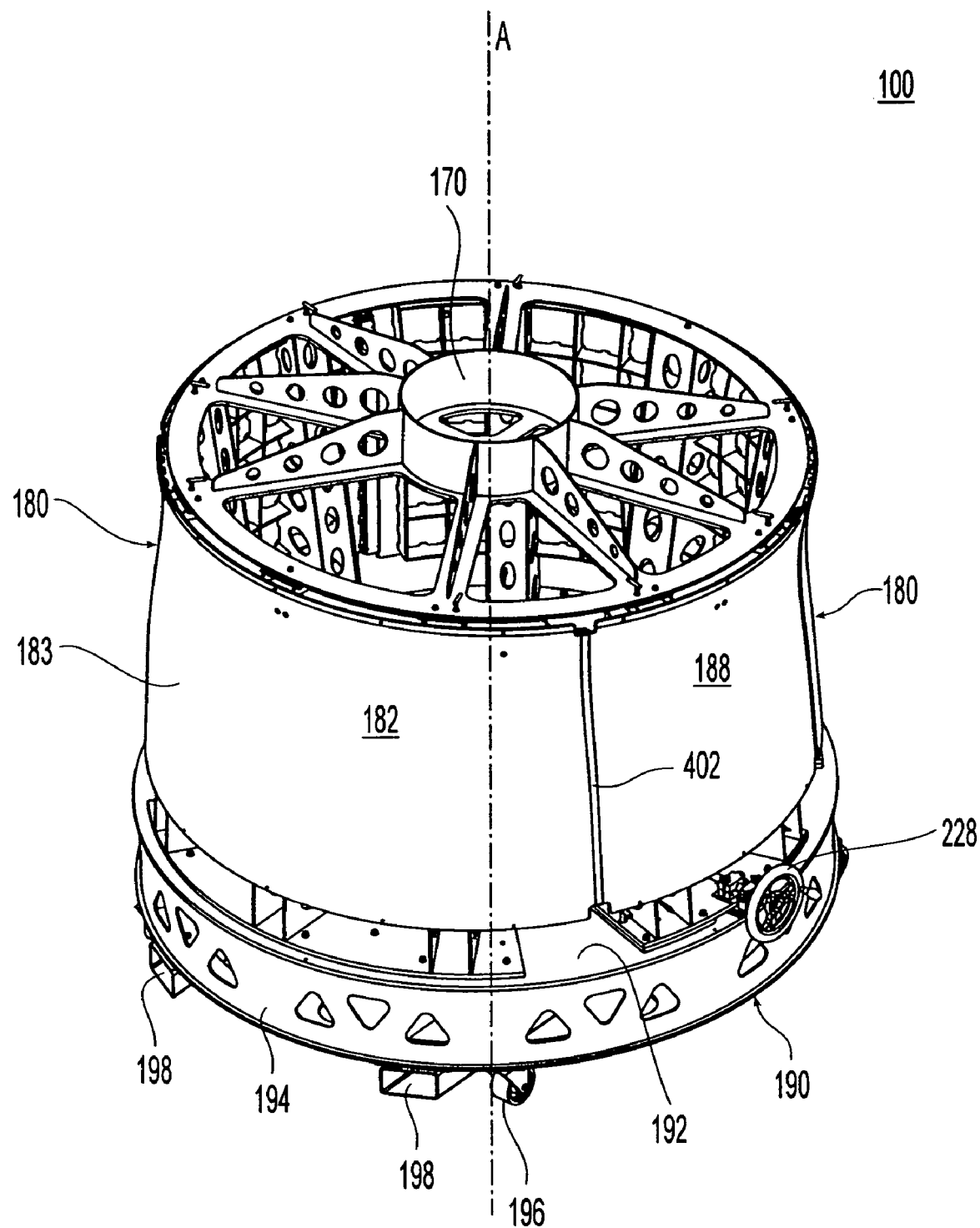
FIG. 1 is a perspective view of a tool in accordance with the present invention in the molding state.
Figure 2:
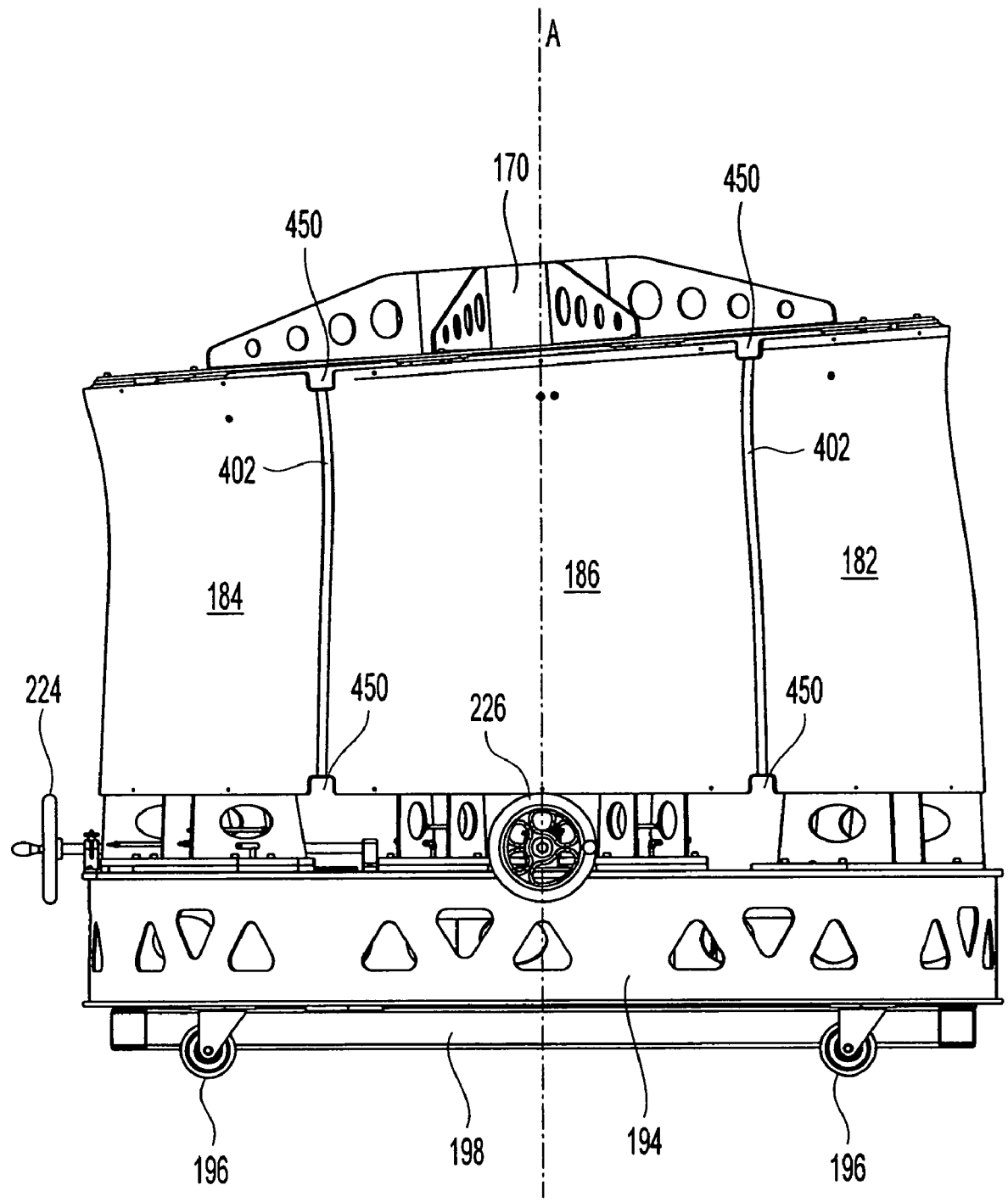
FIG. 2 is a side view of the tool of FIG. 1.
Figure 3:
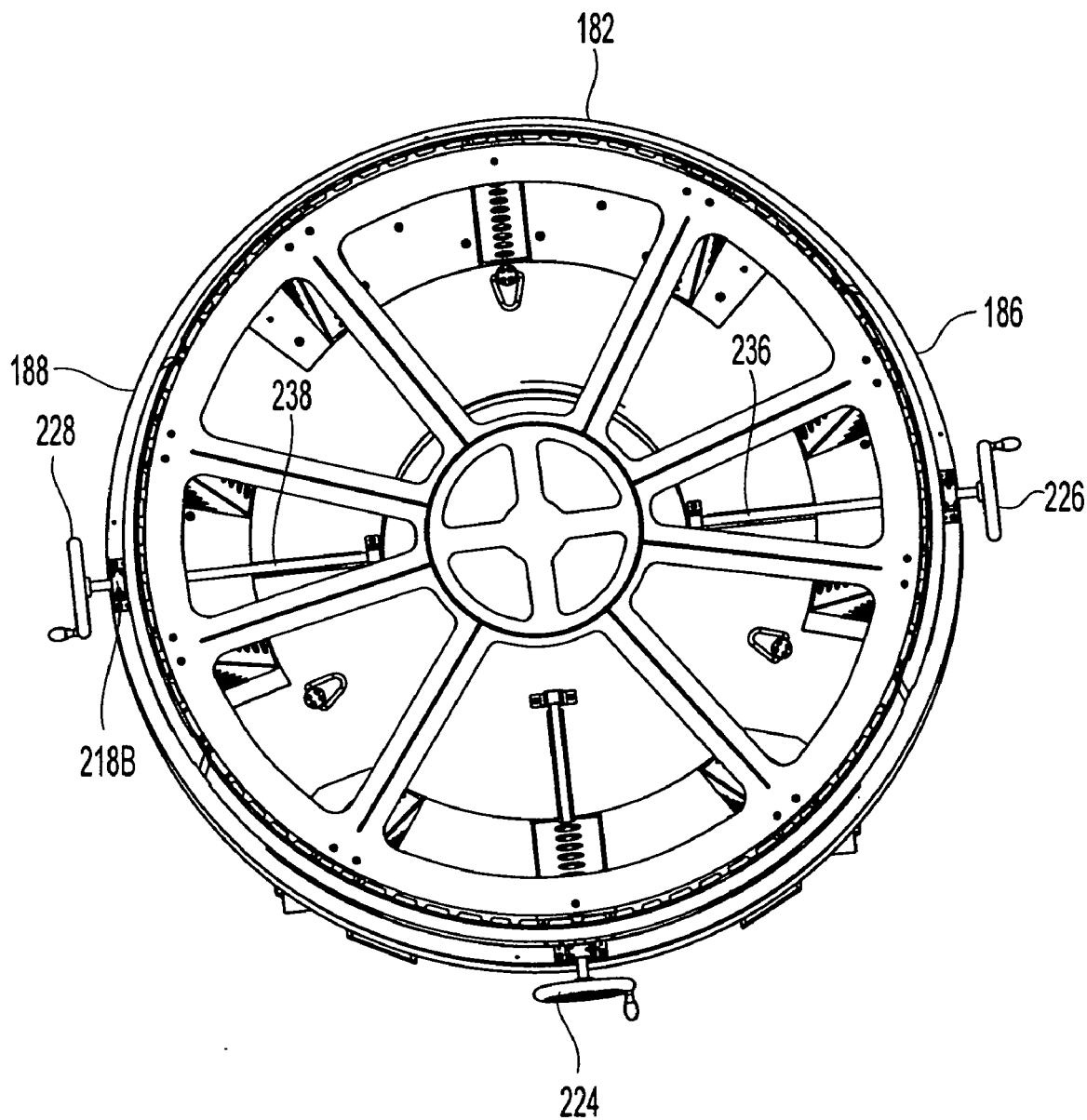
FIG. 3 is a top view of the tool of FIG. 1.
Figure 4:
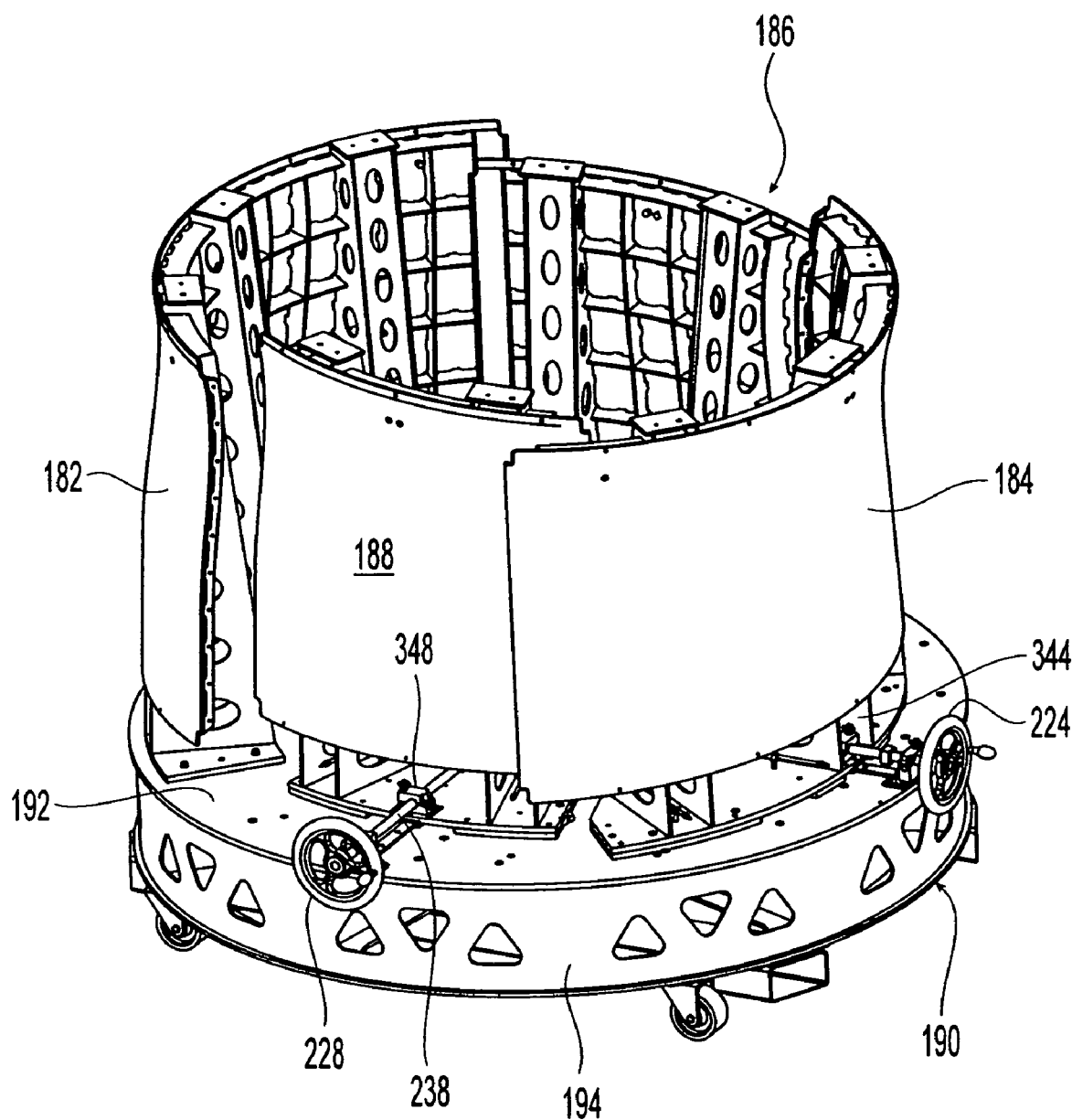
FIG. 4 is a perspective view of the tool of FIG. 1 in a collapsed state with the movable sectors brought radially inward, such as when a part formed on the tool is to be removed.

FIGS. 1-3 show perspective, side and top views, respectively, of a tool 100 in accordance with the present invention. As seen in FIGS. 1-3, the tool is in the "molding" state—i.e., the tool 100 is ready to have one or more layers of composite material applied to its axially extending tubular exterior surface to form a tubular composite member, such as an inner skin of an acoustic inner barrel for an aircraft gas turbine engine. This contrasts with a "collapsed" state, such as seen in FIG. 4, in which a tubular composite member formed on the tool may be removed from the tool.

The tool 100 comprises a plurality of components. Preferably, all the components of the tool are formed of a material having a coefficient of thermal expansion that is similar to that of graphite-epoxy composite, a material commonly used to form a tubular composite. By selecting a tool material having a coefficient of thermal expansion that is similar to that of graphite-epoxy, one can help mitigate separation effects between the tool and the composite being formed thereon, during heating and cooling. In a preferred embodiment, the tool components are made of Invar "36"®.

The tool 100 includes a removable top ring 170, a plurality of sectors 182, 184, 186, 188, and a base 190. Sector 182 is a fixed sector while sectors 184, 186 and 188 are movable sectors. In one embodiment the base has a diameter of about 134" and height of about 123". The tool also comprises additional features to help position the movable sectors and adjust each of the movable sectors between a molding position and a non-molding position, as discussed below. During normal use, a movable sector is considered to occupy a 'molding position' when it is at its radially outermost position; and is considered to occupy a 'retracted position' whenever it is moved in a radially inward direction relative to its 'molding position'.

In the present application, we refer to the entire tool as being in a 'molding position' when all of the movable sectors are in molding positions; we refer to the entire tool as being in a "collapsed position" when any one of the movable sectors is retracted; and we refer to the tool as being in an "non-molding position" when all of movable sectors have been retracted.

The removable top ring 170 helps ensure the position of the various sectors at their top end when the tool is in the molding position. In the embodiment shown, the top ends of the sectors correspond to the forward (or upstream) end of the tubular inner skin formed using the tool.

Figure 5:
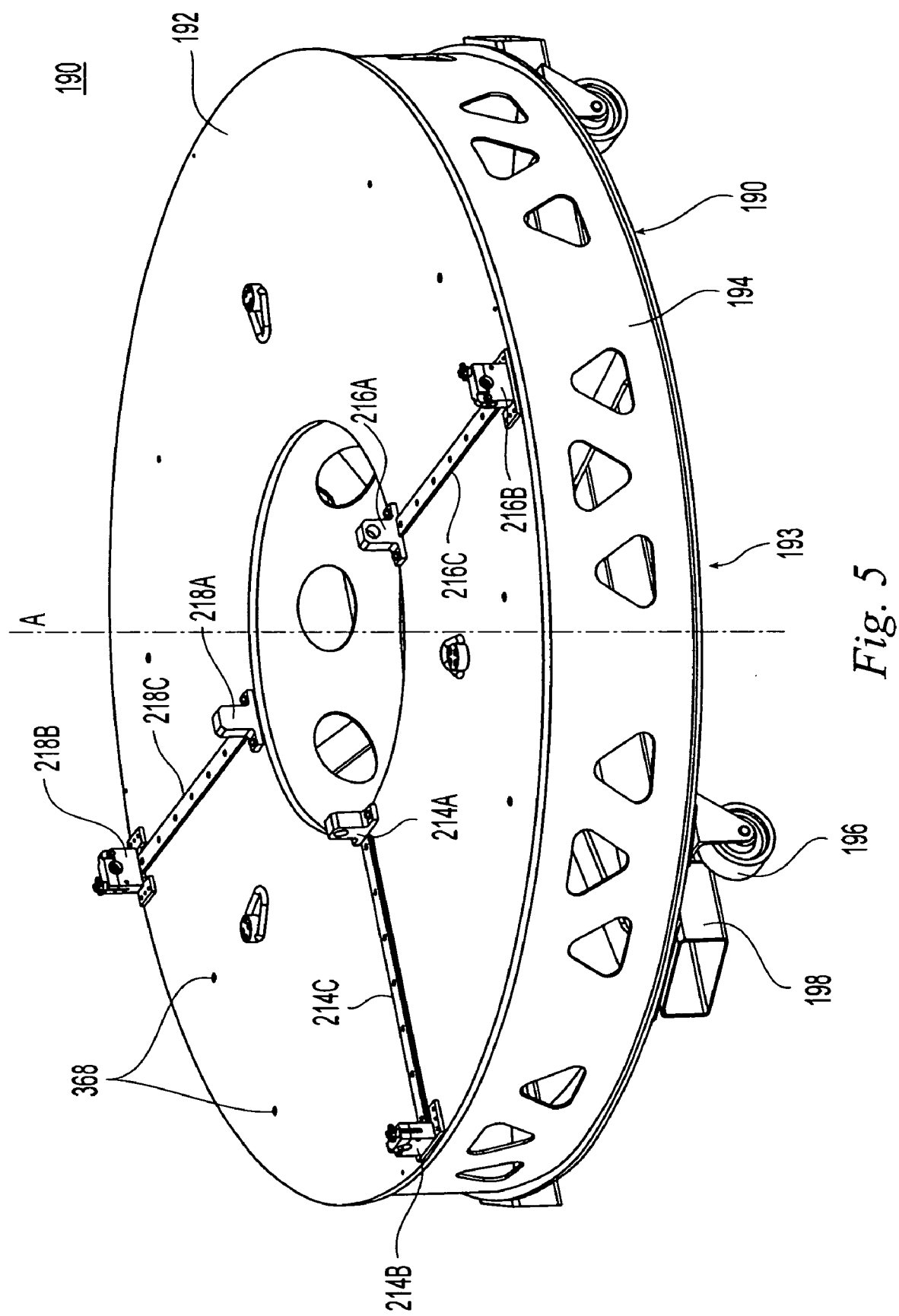
FIG. 5 is a perspective view of the base of the tool of FIG. 1.

As best seen in FIG. 5, the base 190 is circular in shape and comprises an upper surface 192 and a skirt 194 extending downwardly therefrom. A set of four wheels 196 is attached to the bottom 193 of the base 190 to help roll the base along a floor or other surface on which the base 190 rests. The bottom 193 of the base 190 is also provided with at least one pair of tubular members 198 traversing the base in a chord-like manner. The tubular members 198 are configured and dimensioned to serve as forklift receiving structures suitable for receiving forklift prongs, to facilitate lifting and transporting the base 190. The base upper surface 192 has an annular shape and is provided with a plurality of access openings 368, discussed further below.

In one embodiment, the tool 100 comprises four sectors. However, it is understood that in other embodiments, the tool may comprise other numbers of sectors.

Each sector comprises an outer panel, shown generally as 180, provided with a shaped surface 183 that conforms to a portion of the composite tubular structure to be formed using the tool. In the embodiment shown, sector 182, which preferably subtends about 120° relative to a central axis A of the base 190, is a fixed sector and so does not move relative to the base upper surface 192, when the tool is adjusted between a molding position and a collapsed position. The remaining three movable sectors 184, 186 and 188, however, do move relative to the base upper surface 192. In one embodiment, each of these movable sectors is arranged to move in a radial direction, relative to the central axis A of the base 190; each of the movable sectors being completely separable from the other sectors. In the molding position, the movable smaller sectors 186, 188 are in a radially outward position of the base and adjacent to side edges of the fixed sector 182, while in the non-molding position, the movable smaller sectors 186, 188 are in a radially inward position of the base and radially spaced from side edges of the fixed sector.

While the base 190 preferably is circular, it may have some other shape instead. In such case, it is understood that the movable sectors can be moved relative to some axis around which they are centered.

As best seen in FIG. 4, movable large sector 184 is diametrically opposite to fixed sector 182 and also subtends about 120° relative to the axis A. Movable smaller sectors 186 and 188 are positioned between sectors 182 and 184 and are diametrically opposite one another. Each of the smaller movable sectors subtends about 60° relative to the axis A.

Figure 6:
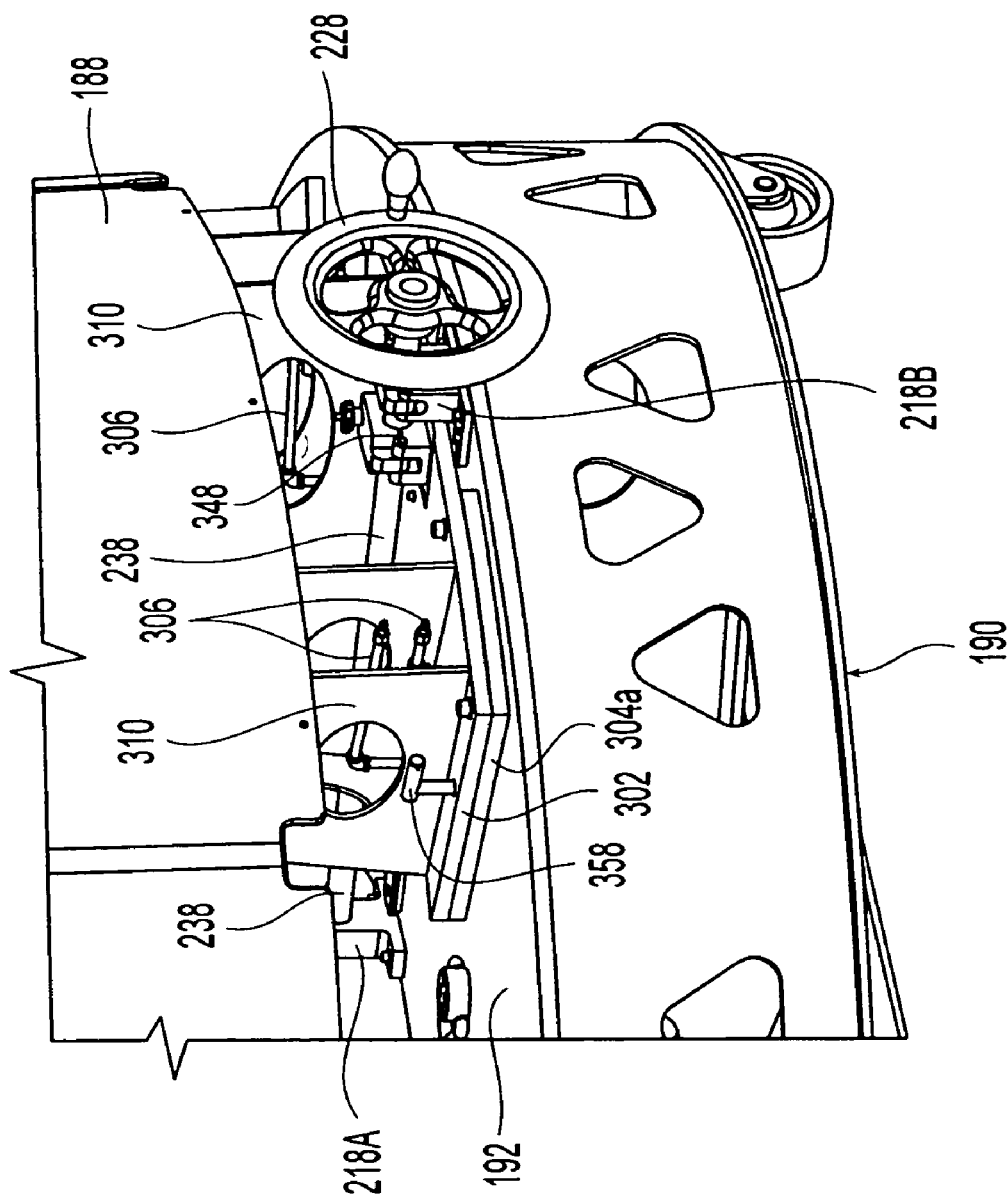
FIG. 6 shows a detailed view of the structural support and positioning assembly of a movable sector from outside the tool.
Figure 7:
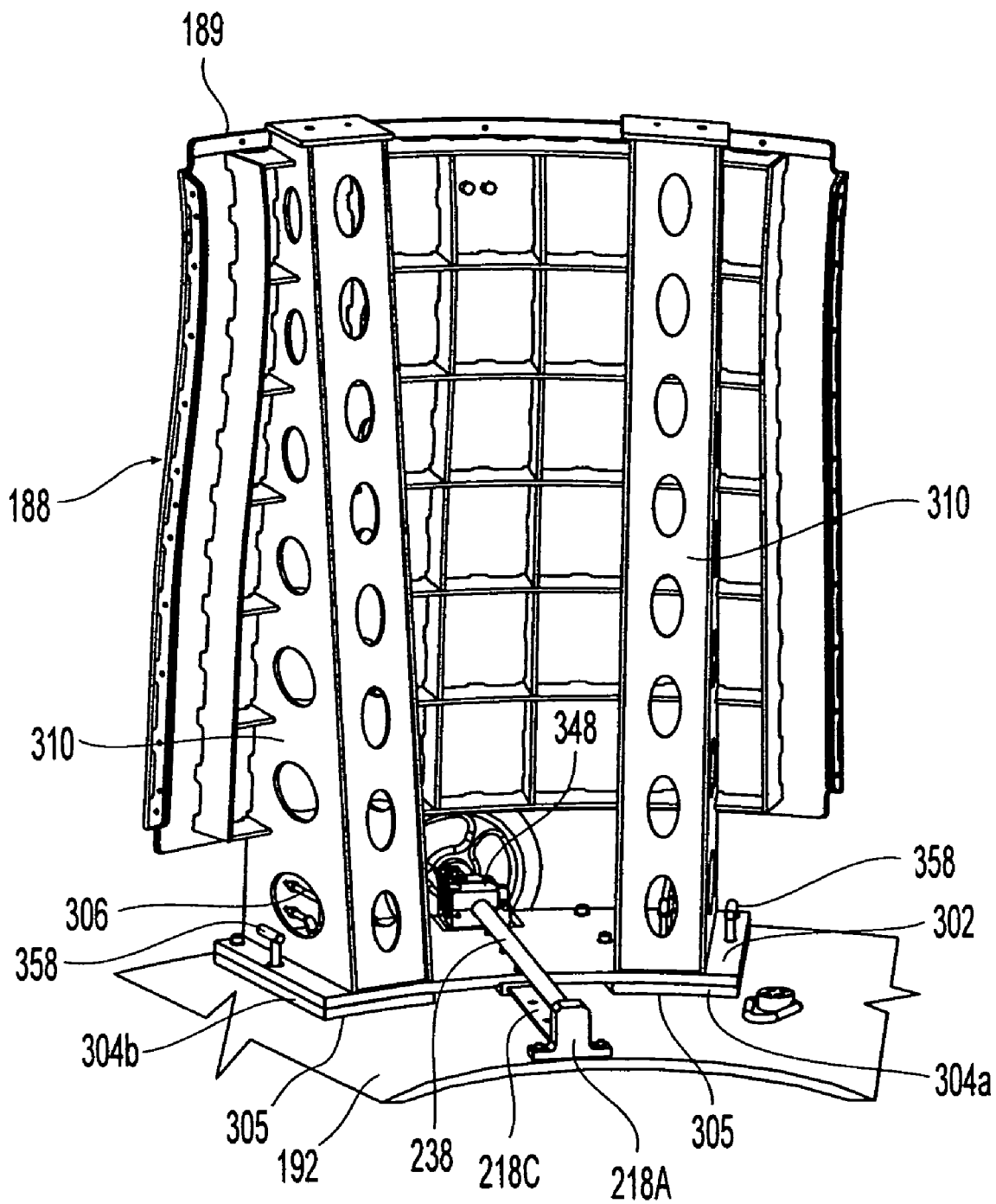
FIG. 7 shows a detailed view of the structural support and positioning assembly of a movable sector from inside the tool.

FIGS. 6 and 7 show how movable sector 188 is supported on the base upper surface 192, and moves in a radial direction along the base upper surface 192. It is understood that movable sectors 184 and 186 also have comparable features and behave in a similar manner.

The movable sector 188 comprises an outer panel 189 that is supported by a pair of support columns 310 which themselves project upwardly from a sector support plate 302. The weight and weight distribution of the sector 188 is such that its center of gravity is over the sector support plate 302. Mounted on the sector support plate 302 is a radially outward shaft mount 348, discussed further below.

The sector support plate 302 rests upon a pair of spaced apart sliding abutment plates 304a, 304b. Bolts are used to secure the sector support plate 302 to the sliding abutment plates 304a, 304b to ensure that they do not move relative to one another.

Each sliding abutment plate 304a, 304b rests upon the base upper surface 192. The bottom surface 305 of each sliding abutment plate 304a, 304b, and at least portions of the base upper surface 192 that are in abutment with the bottom surface 305 of sliding abutment plates 304a, 304b, are preferably machined, sanded or otherwise treated to form flat, smooth, and parallel surfaces and reduce friction therebetween.

The flat bottom surface 305 of each sliding abutment plate 304a, 304b is further provided with at least one opening (not shown) which communicates with one or more or nozzles 306 connectable to a supply of compressed air. In general, a plurality of such nozzles 306 are provided. In one embodiment, for movable sector 188, a total of four such nozzles are provided. A larger movable sector may have six, or even more, such nozzles.

The at least one opening may comprise a simple circular hole, preferably having a diameter on the order of 0.5 inches or so. When a pressurized air source is connected to the nozzles 306, air is forced through the opening and pushes against the base upper surface 192, further reducing the friction between the flat bottoms 305 of sliding abutment plates 304a, 304b and the base upper surface 192. Under these conditions, the sliding abutment plates 304a, 304b serve as air bearings 304a, 304b, which facilitate translation of movable sector 188 in a radial direction along the base upper surface 192.

The resulting air bearings 304a, 304b provide several benefits. First, they may obviate the need for lubricant on abutting surfaces that slide relative to one another. Eliminating lubricant both simplifies use and helps reduce contamination of the molded composite structure. Second, they permit each movable sector to be moved along the radial direction by just one person manually turning a hand wheel (discussed further below), even though the movable sectors may weigh upwards of 2,500 pounds or more.

Once the movable sector 188 is moved in a radial direction to near a desired position, locating pins 358 are used to secure the movable sector 188 to the base upper surface 192. The locating pins 358 pass through aligned openings (not shown) in the sector support plate 302 and the sliding abutment plate 304, and into locating openings 368 formed in the base upper surface 192. This helps ensure repeatable positioning of the movable sector 188 relative to the base upper surface 192.

The movable sectors 184, 186, 188 are translated along the radial direction by means of manually operated hand wheels 224, 226, 228, respectively. Hand wheels 224, 226, 228 are operatively connected to threaded shafts 234, 236, 238 so that turning a hand wheel turns the corresponding shaft. While hand wheels are preferred, it is also possible to use small motors (not shown) mounted either on the base or on the movable sectors, to selectively move the movable sectors between a molding position and a retracted position. Such motors may be electric, pneumatic, or driven by other power.

As best seen in FIG. 5, mounted on the base upper surface 192 are a plurality of radially inward shaft mounts 214A, 216A, 218A and a corresponding plurality of hand wheel mounts 214B, 216B, 218B. Radially directed guide members 214C, 216C, 218C are positioned between corresponding radially inward shaft mounts 214A, 214B, 214C, respectively, and hand wheel mounts, 214B, 216B, 218B, respectively.

Each of the radially inward shaft mounts 214A, 216A, 218A comprises a block into which the distal end of its corresponding shaft 234, 236, 238, respectively, is inserted.

Mounted on each of the sector support plates is a radially outward shaft mount. As best seen in FIGS. 6 and 7, sector support plate 302, which is associated with movable sector 188, is provided with radially outward shaft mount 348. Thus, shaft 238 is supported at its distal end by radially inward shaft mount 218A and is supported at its proximal end by radially outward shaft mount 348. It is understood that shafts 234 and 236 are supported in a comparable manner.

Radially outward shaft mount 348 comprises a hinged block of a first kind, whose structure and operation are known to those skilled in the art. Such hinged blocks have a top portion hingedly connected to a bottom portion, and a hand knob to tighten the two in the closed position. When the hinged block is closed and the top portion overlays the bottom portion, an opening is formed between the two portions. This opening is threaded so as to accommodate the complementarily threaded shaft 238. When the threaded shaft 238 is turned, the shaft threads cause the radially outward shaft mount 348 (and thus the movable sector 188 attached thereto) to travel along the shaft 238. It is understood that the radially outward shaft mounts mounted on the other two sector support plates (e.g., radially outward shaft mount 344, seen in FIG. 4) also comprise such a hinged block, and shafts 234, 236 act in a similar manner.

Each of the hand wheel mounts 214B, 216B, 218B comprises a hinged block of a second kind, whose structure and operation are also known to those skilled in the art. The hand wheel mounts 214B, 216B, 218B are similar in construction to radially outward shaft mount 348, except that the opening formed between the top and bottom portions is not threaded. For each movable sector, the corresponding hand wheel mount, the radially inward shaft mount and the radially outward shaft mount are all collinear.

Also, while hinged blocks are preferred, one may instead use conventional blocks which would be unbolted from the base or the movable sector, each time the hand wheel or shaft was to be removed. Other means and mechanisms for moving the sector support plate 302 (and the movable sector mounted thereon) relative to the base upper surface are also possible, as will be recognized by those skilled in the art.

When the movable sectors are to be moved, each hand wheel is mated to a corresponding shaft with the former being retained in a corresponding hand wheel mount and the latter being retained near its proximal end in a corresponding radially outward shaft mount and near its distal end in a corresponding radially inward shaft mount.

When a given movable sector need no longer be moved, such as upon reaching its molding position, its two hinged blocks, i.e., the hand wheel mount and the radially outward shaft mount, may be opened, and the hand wheel and the shaft removed. As discussed further below, the hand wheel and the shaft are removed when the tool is placed in an autoclave or other oven for curing. This allows easier access to portions of the tool, and also may help prevent contamination of the autoclave during the curing process by lubricants that may be present on such components.

When adjusting the tool 100 from a first position (such as seen in FIGS. 1-3) in which composite material may be applied on an outer surface of the tool to a second position (such as seen in FIG. 4) in which the inner skin may be removed after the curing process, the two smaller movable sectors 186, 188 are retracted first, and then the larger movable sector is retracted. Retraction of the tool 100 into a non-molding position in this fashion allows the inner skin to be removed therefrom. It is understood, however, that the distances by which the various movable sectors are retracted will depend on the shape and size of the tubular composite being formed.

Figure 8:
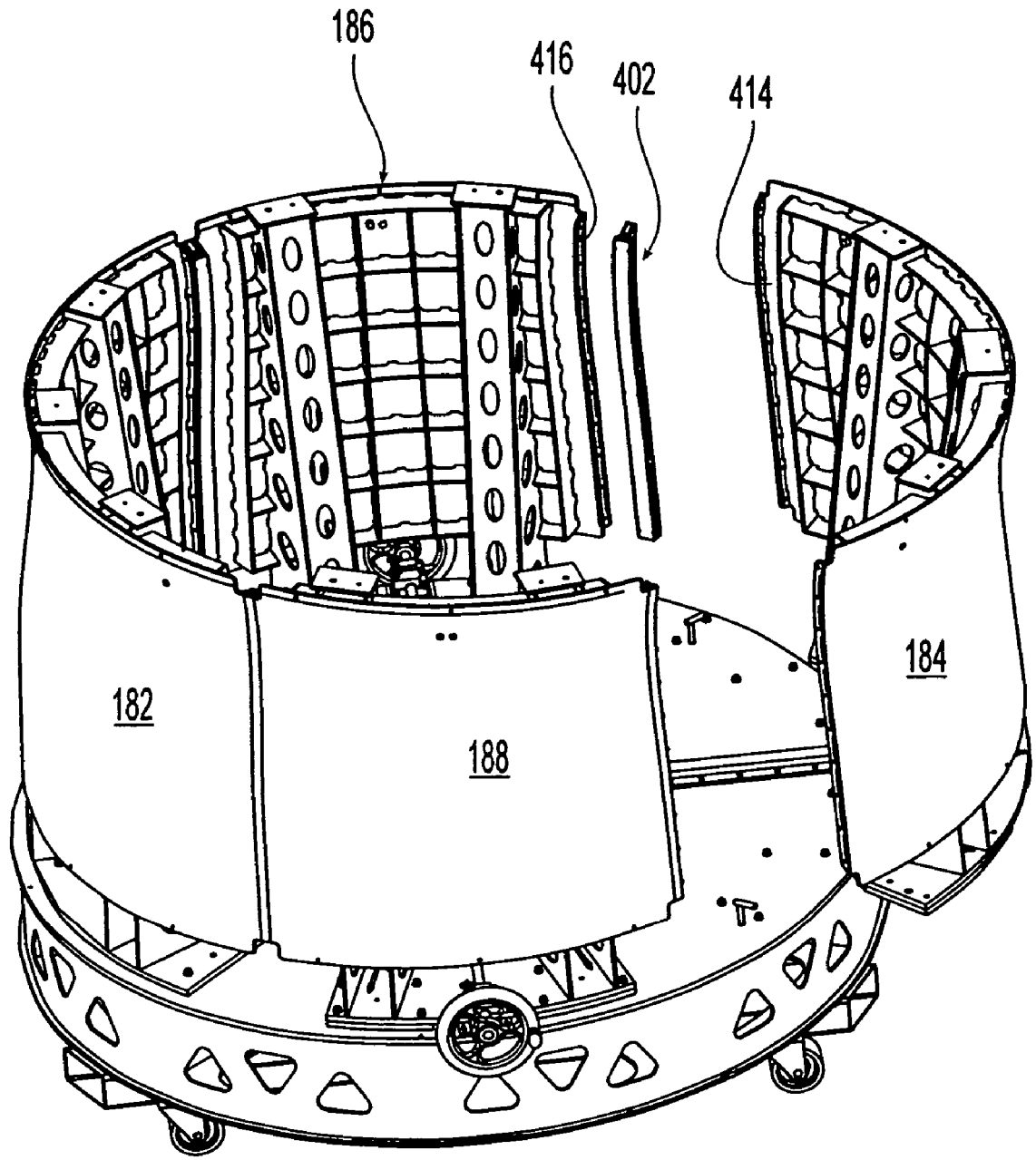
FIG. 8 shows a partially exploded view of a tool in accordance with claim 1, with the splice plate seen in isolation.
Figure 9:
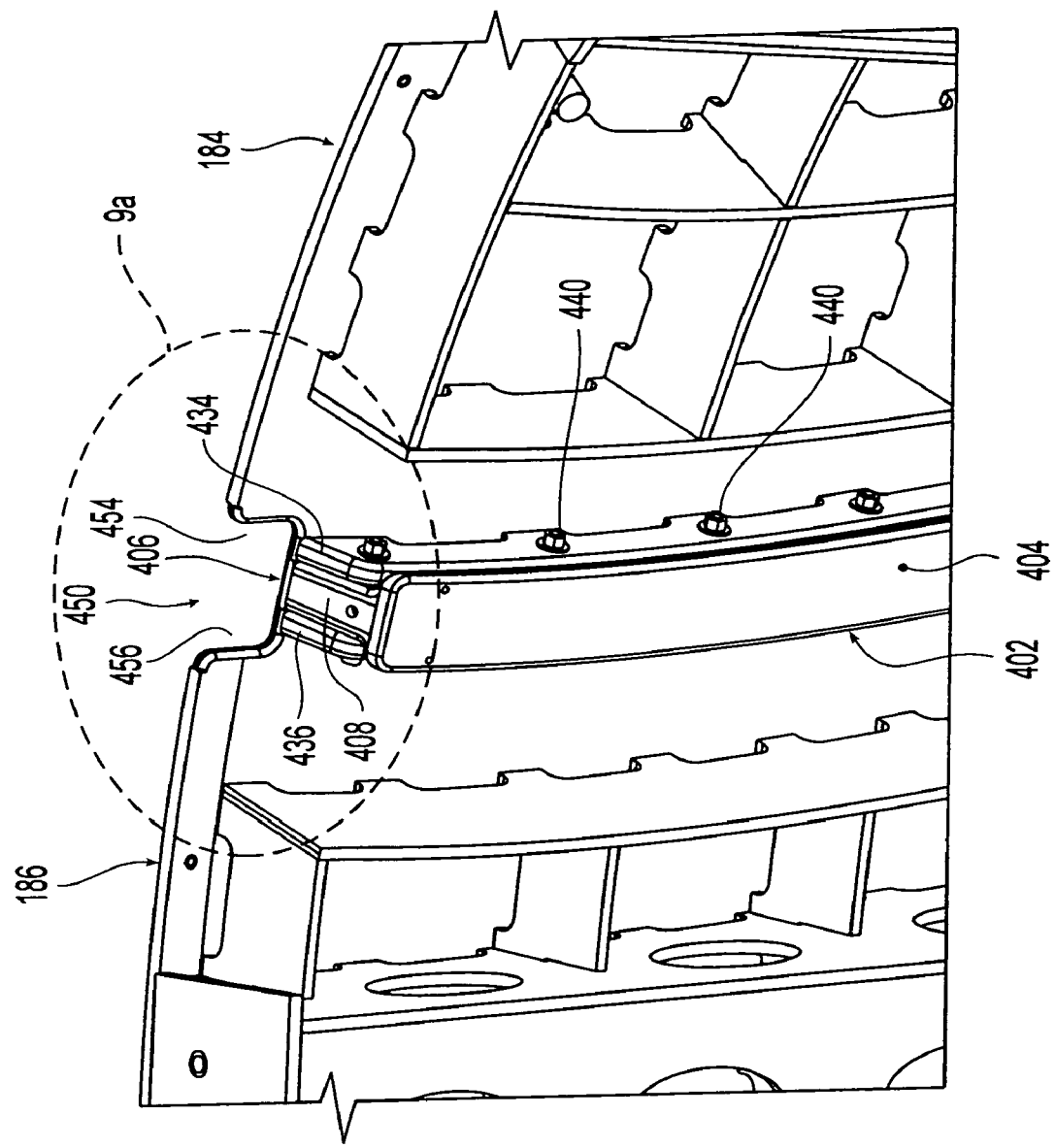
FIG. 9 shows a close up of a splice plate positioned between a pair of adjacent sectors and FIG. 9a shows a detailed view of a portion of FIG. 9.

FIGS. 8 and 9 show a splice plate 402, or "splitter bar", in accordance with the present invention. The splice plate 402 is positioned between the facing side edges 414, 416 of adjacent sectors 184, 186, respectively. The splice plate 402 connects adjacent sectors 184, 186 and maintains their mutually facing side edges in alignment with one another. And as seen in FIGS. 1-3, the outer surfaces of the splice plates form a portion of an outer contour of the tool, when the tool is in the molding position. The splice plates are constructed and arranged to provide the exterior of the tool 100 with a smooth outer surface. One way to characterize the smoothness of the outer surface is with reference to the maximum step difference along the side edges of adjacent sectors. In one embodiment, this step difference is less than 0.05 inches. More preferably, however, the step difference is on the order of less than 0.002 inches.

Figure 9A:
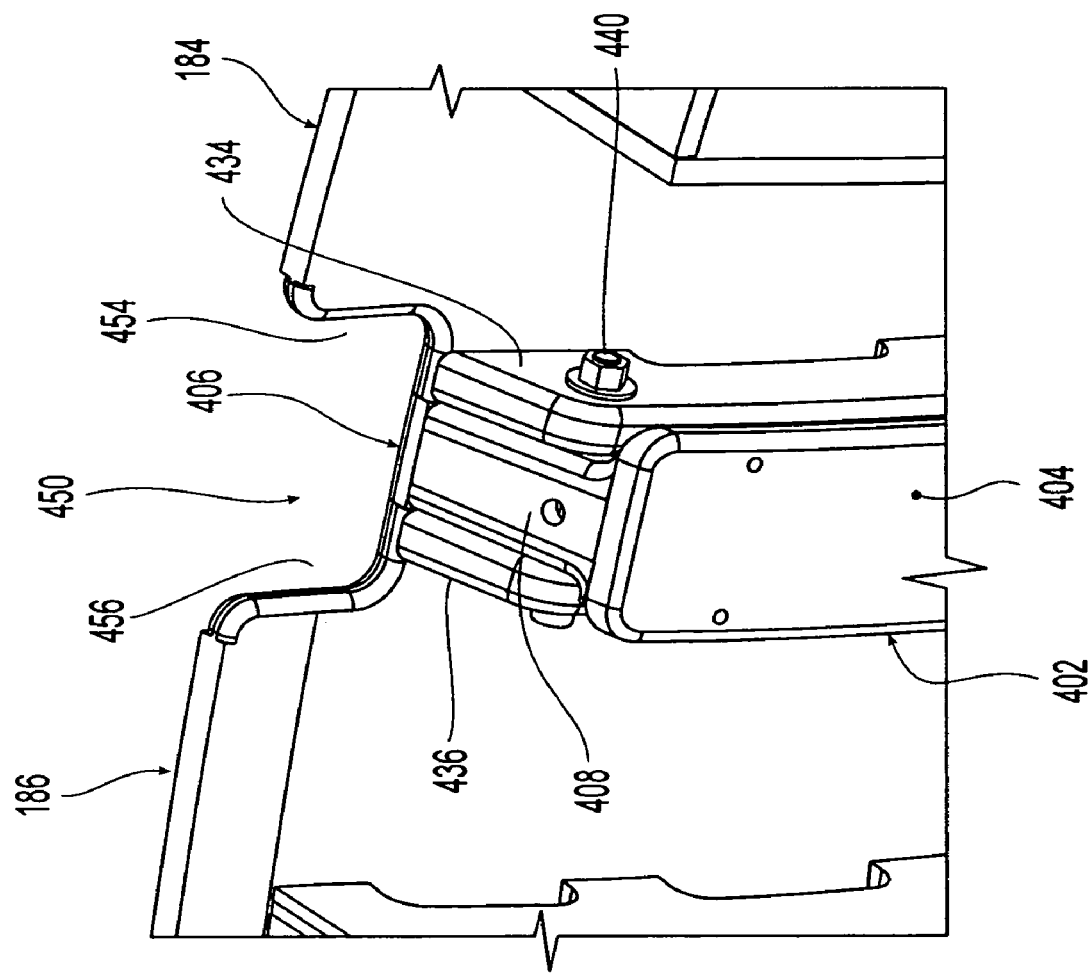

As best seen in FIGS. 9 and 9a, the splice plate 402 has a T-shaped cross section. The head 404 of the splice plate 402 faces the inside of the tool while the outwardly face base 406 of the radially extending leg 408 of the splice plate 402 faces the outside of the tool and forms a narrow, vertically directed portion of the tool's exterior surface. The circumferentially directed sides of the leg 408 abut radially inwardly extending flanges 434, 436 formed on the facing side edges 414, 416, respectively. Bolts 440 pass through a first flange 434, through the radially extending leg 408 of the splice plate, and into the second flange 436. This allows the adjacent sectors 184, 186 to be bolted together to provide a smooth outer surface on the tool and thereby minimize any steps that might otherwise form where adjacent sectors meet. INCONEL.RTM. Belleville (spring) washers are used in conjunction with the bolts 440 to help retain torque during thermal cycling in an autoclave or other oven, during the curing process.

When the tool 100 is being adjusted into the molding position, the splice plate 402 is added last, after the movable segments have been positioned. When the tool 100 is being adjusted from the molding position to the non-molding position for removal of a part formed thereon, the splice plates 402 are removed first. Removing the splice plate first relieves tension between the tool and the formed part.

In the foregoing discussion of FIGS. 8 and 9, only a single splice plate, between two specific adjacent sectors was discussed. It is understood, however, that such splice plates are positioned between each adjacent pair of sectors, be the sectors fixed or movable.

As seen in FIGS. 1, 2 and 9, notches 450 appear between all pairs of adjacent sectors (all four corners of all the sectors 182, 184, 186 and 188 having been provided with cutouts 454, 456) both at the top end and at the bottom end of the splice plates 402. As discussed further below, these notches 450 are regions where ends of polymer films meet to seal the composite material, prior to and during curing.

To form a composite inner skin for an aircraft nacelle, the tool 100 is adjusted to the molding position and composite material is applied in a pre-determined horizontal band between the upper and lower edges 592, 594 (see FIG. 10) of the tool sectors 182, 184, 186, 188 (and also over the outwardly facing base 406 the splice plates 402). The composite material, and the techniques used to apply the composite material to the tool, are well known to those skilled in the art.

After the composite material has been applied, it is covered with plastic film and vacuum sealed. The plastic film is placed on the outside of the tool over the composite material, and also on the inside of the tool over the splice plate regions. Beads of sealant are used to adhere the plastic film to the tool.

Figure 10:
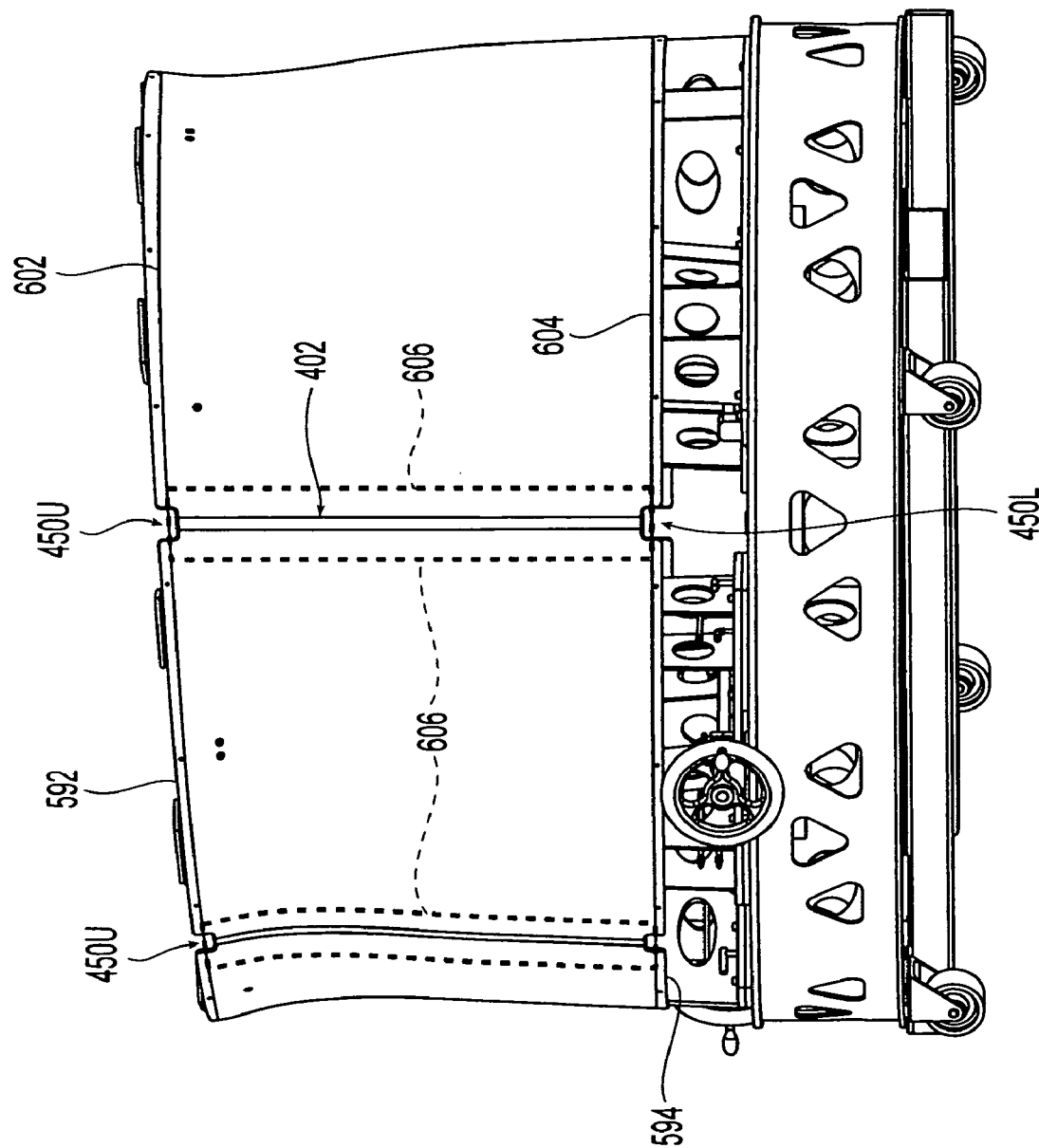
FIG. 10 shows sealant beads on the outer surface of the tool.
Figure 11:
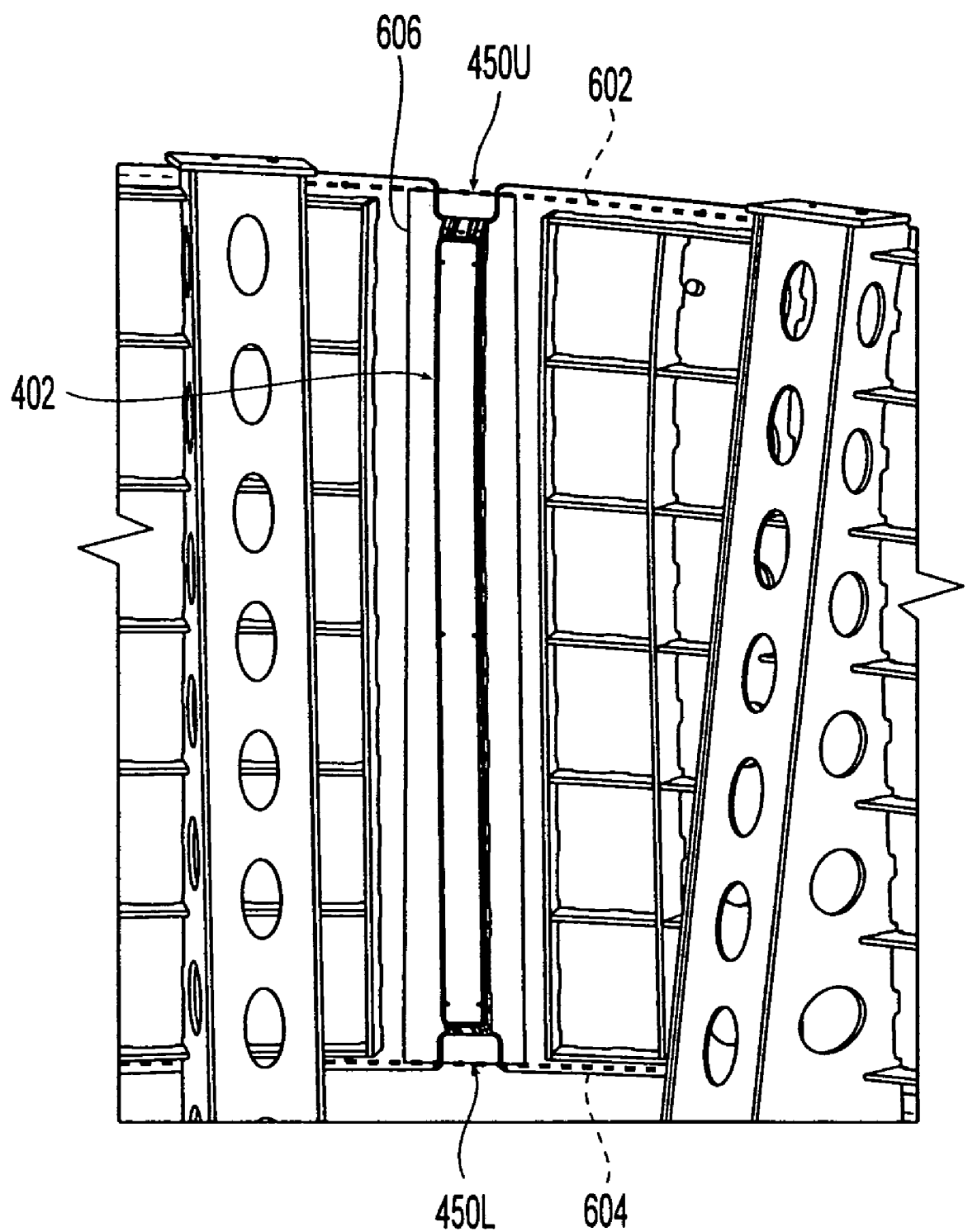
FIG. 11 shows a sealant bead on the inner surface of the tool around a splice plate.

As seen in FIG. 10, the beads of sealant 602, 604 run circumferentially around the outer surface of the tool 100. The bead 602 is applied to the tool outer surface, above the upper axial extent of the composite material. Likewise, the bead 604 is applied to the tool outer surface below the lower axial extent of the composite material. In other words, and as a result, the composite material is entirely between the bead 602 and bead 604. Upper outer bead 602 is proximate the upper edge 592 of the sectors and crosses the upper notches 450U. Similarly, lower outer bead 604 is proximate the lower edge 594 of the sectors and crosses the lower notches 450L. As seen in FIG. 11, a bead 606 is placed all around the splice plate 402 on the inner surface of the tool. The bead 606 encircles the splice plate 402 joining two adjacent sectors, and crosses both the upper notch 450U and the lower notch 540L, but from the inside. As seen in FIGS. 10 and 11, at notch 450U, bead 602 overlaps bead 606 while at notch 450L, bead 604 overlaps bead 606.

In FIG. 10, the bead 606 is shown as a dashed line, since it is actually on the inside of the tool, while in FIG. 11, beads 602 and 604 are shown as dashed lines since they are actually on the outside of the tool. As is known to those skilled in the art, vacuum bag sealant tape (two-sided "chromate tape" with peel-off backing on both sides), such as model no. GS 213-3, available from General Sealants of Industry, CA may be suitable for use as beads 602, 604, 606.

With the upper outer bead 602, the lower outer bead 604 and the inner bead 606 in place, a first portion of polymer film, such as a nylon film, is placed on the outer surface of the tool 100. This first portion of film is a single piece that extends around the entire circumference of the tool and is overlapped in the circumferential direction by an inch or so, the overlapping ends secured by an axially extending piece of chromate tape. This first portion of nylon film is of sufficient height to contact the upper and lower beads 602, 604. Preferably, the upper edge of the nylon film extends above the upper bead 602 around the entire circumference of the tool, while the lower edge of the first portion of nylon film extends below the lower bead 604 around the entire circumference of the tool. The first portion of the film also extends across each notch 450U, 450L, and is secured to those portions of beads 602 and 604 that extend across each notch as seen in FIGS. 10 and 11. In one embodiment, an IPPLON® KM 1300 nylon film, available from Airtech International, Inc. of Huntington Beach, Calif. is used.

A second portion of nylon film, which is sized to cover at least the entire splice plate 402 and contact the entire inner bead 606 is then applied on the inside surface of the tool. It is understood that four such inner beads 606 and four such second portions of nylon film are used, each covering one of the four splice plates 402 in the embodiment shown. Each inner bead 606 extends across each notch 450U and 450L, and thereby secures each second film portion across each notch. At each upper notch 450U, the upper bead 602 and the upper portion of the inner bead 606 overlap each other as they extend circumferentially across each notch. Similarly, at each lower notch 450L, the lower bead 604 and the lower portion of inner bead 606 overlap each other as they extend circumferentially across each notch. As a result of the overlaps of the outer beads 602, 604 with upper and lower portions of the inner bead 606 at the notches 450U, 450L, when the first and second portions of film are applied to their respective bead on the tool, the first film portion and the second film portion sealingly join and engage each other. In this manner, a vacuum bag is formed, the vacuum bag creating a seal around the splice plates 402 and the adjoining areas where the edges of the sectors 182, 184, 186, 188 are present.

Figure 12:
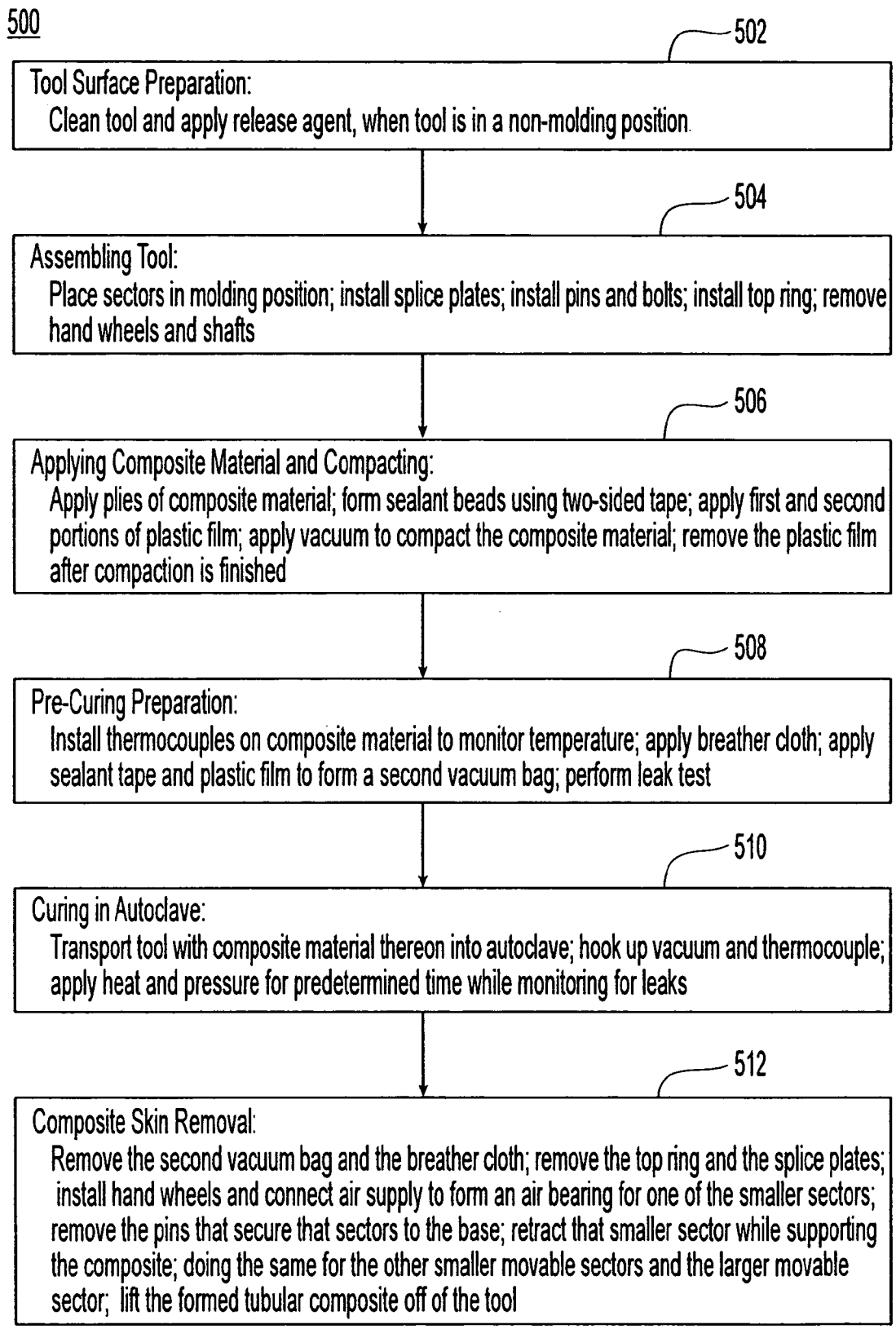
FIG. 12 shows the principal steps in an exemplary process for making a tubular composite using the tool of FIG. 1.

An exemplary use of the tool 100 is presented next with reference to FIG. 12. This exemplary use illustrates one embodiment of a process 500 for making a composite inner skin of a 360° acoustic inner barrel for a nacelle inlet, using the tool 100. The process entails a number of phases: tool surface preparation 502; tool assembly 504 application of composite material 506; preparation for curing 508; curing in an autoclave 510; and composite inner skin removal 512.

First, the tool surface is prepared, in a known manner. The tool surface preparation process 502 entails:

(1) Adjusting the tool into a non-molding position (if not already done);
(2) Cleaning the tool with a solvent; and
(3) Applying a release agent, such as FREEKOTE™ to the outer surfaces of the sectors.

Next, the tool is assembled and configured for use. As seen in FIG. 12, the tool assembly process 504 entails:

(1) Moving the movable tool sectors 184, 186, 188 in a radially outward direction into their molding position. Pressurized air is used to form air bearings, as described above, to facilitate movement of the sectors;
(2) Installing the splice plates 402 between adjacent sectors by bolting each plate to its respective pair of opposing flanges on the sectors;
(3) Installing pins to secure the sectors.
(4) Positioning the top ring 170, such as by lowering it onto the sectors by means of a crane and then bolting it to upper portions of the sectors; and
(5) Opening the hinged blocks 214B, 216B, 218B, 348 and removing the hand wheels 224, 226, 228 and shafts 238.

After the tool 100 is assembled, composite material is applied to the external surface of the tool in a conventional lay-up process and compacted by vacuum. The composite material application and compaction process 506 entails:

(1) Laying on plies of composite material in the form of graphite-epoxy prepreg fabric on the tool's outer surface. Segments of the fabric about 45 inches in height, each circumferentially subtending about 60°, are placed on the outer surface of the tool, adjacent segments overlapping one another by about 1 inch. No tape or adhesives are used to secure overlapping fabric segments since they may contaminate the final composite structure. About 3 or 4 such plies are layered on at a time;
(2) Applying two-sided vacuum bag sealant tape around the top and bottom peripheries of the outer surface of the tool and along the splice plate areas on the inner surface of the tool to form the sealant bead. The two-sided tape is applied to the outer surface of the tool, and not to the surface of the composite material. On the outer surface of the tool, a gap of about 5 to 7 inches is left between the circumferentially extending upper and lower edges of the composite material and the circumferentially extending upper and lower sealant beads;
(3) Applying polymer film to form a first vacuum bag around the fabric and along the splice plate areas. A first portion of polymer film is wrapped around the circumference of the tool such that it contacts and seals against the upper lower beads of sealant tape in the manner described above. Additionally, each of four second portions of polymer film is applied in sealing arrangement against a corresponding one of the four tape beads that extend around each splice plate, in the manner described above. The first portion of polymer film sealingly engages the four second portions of polymer film at each notch pair;
(4) Compacting the plies against the tool surface by applying a vacuum to the first vacuum bag. A metal fitting is installed on the vacuum bag, such as by taping with sealant tape, a first end of a hose is connected to the fitting and a second end of the hose is connected to a vacuum pump. The suction exerted by the vacuum pump is sufficient to compact the composite material. Therefore, no mechanical pressure other than that provided by the plastic film of the vacuum bag pressing against the composite material is needed to perform the compaction; and
(5) After compacting for 20-30 minutes, releasing the vacuum and removing the first vacuum bag and sealant tape. At this point, the composite materials have been compacted.

Next, in a pre-curing phase 508, the tool with the compacted fabric thereon is prepared for the autoclave. Preparation for curing entails:

(1) Installing thermocouples on the tool and on the composite material to monitor the curing process;
(2) Applying breather cloth over the compacted composite material. In a preferred embodiment, the breather cloth is a nylon mat, such as Model No. Ultraweave 1332, available from Airtech International of Huntington Beach, Calif.;
(3) Applying a fresh layer of two-sided vacuum bag sealant tape and polymer film to form a second vacuum bag in the same manner as described above with respect to the first vacuum sealant bag. The second vacuum bag is formed over the breather cloth which itself covers the compacted composite material; and
(4) Applying vacuum to the second vacuum bag and performing a leak test by applying a vacuum and gauging the pressure to determine whether a leak is present.

After this, the tool, with the composite materials applied thereon, along with the breather cloth, is cured in an autoclave. The autoclave curing phase 510 entails:

(1) Moving the tool 100 into the autoclave and hooking up vacuum and thermocouple connections;

(2) Closing the autoclave door and running through a predetermined heat and pressure cycle to cure the composite. The vacuum bag remains under vacuum until the autoclave pressure is high enough above atmospheric pressure, at which point the vacuum bag is vented to atmospheric pressure. The bag is monitored to ensure that it does not go to positive pressure during the cure cycle, positive pressure indicating a leak; and (3) Opening the autoclave and removing the tool 100 with the tubular composite formed thereon.

After curing in the autoclave, the composite inner skin is removed from the tool 100. The composite inner skin removal process 512 entails:

(1) Removing the vacuum bag and the breather cloth;
(2) Removing bolts securing the top ring 170 to the sectors and then removing the top ring;
(3) Removing bolts securing the splice plates 402 to the flanges;
(4) Removing the splice plates 402 from between adjacent pairs of sectors;
(5) Installing the hand wheels 224, 226, 228 and shafts 348;
(6) Hooking up pressurized air to a selected one of the smaller movable sectors 186, 188 to create an air bearing;
(7) Removing the pins and bolts securing the selected movable sector 186, 188 to the base 190;
(8) Slowly sliding the selected movable sector (with the assistance of the air bearing) and progressively releasing the composite skin from the tool surface while supporting the bottom and/or top edges of the skin to prevent it from falling;
(9) Repeating steps (6), (7) and (8) for the other smaller movable sector 188, 186 and then the larger movable sector 184; and
(10) Lifting the composite inner skin of the tool from the tool 100.

It is understood that there may be other steps in each of the above-described phases. It is also understood that the some of the steps in one or more of the above-described phases may be taken out of the sequence presented above.

Once the composite inner skin is formed, it generally is subject to additional processing, such as perforation for acoustic attenuation. This, however, is done by a separate process using separate tools. The acoustic core and the outer skin are also formed using separate processes and separate tools.

Figure 13:
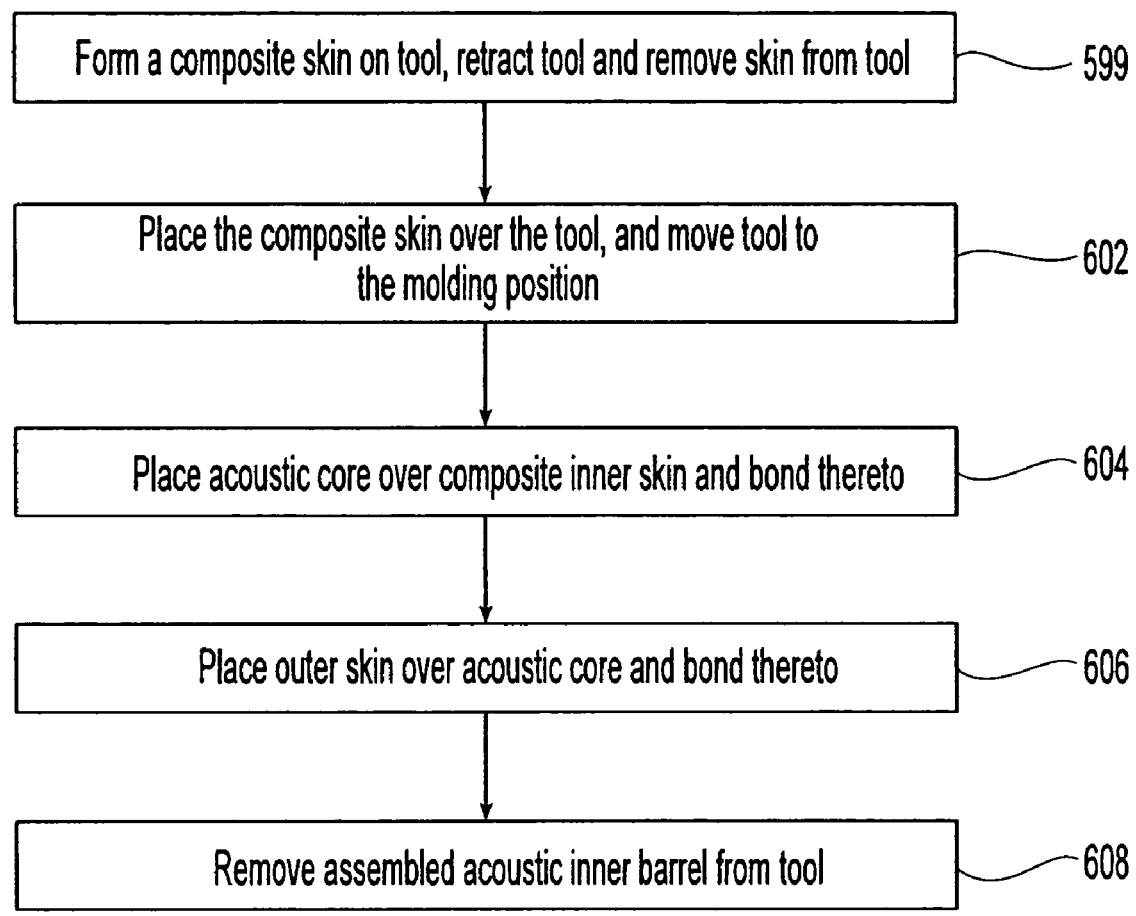
FIG. 13 shows the principal steps for using the tool of FIG. 1 to assemble an acoustic inner barrel.

An acoustic inner barrel may be formed by bonding together the composite inner skin, the acoustic core and the outer skin, with help of the tool 100. FIG. 13 shows a process 600 to accomplish this. First, in step 602, the composite inner skin is placed over a slightly collapsed tool 100 and the tool is then adjusted to the molding position such that the outer surface of the tool supports the inner skin. As indicated by preliminary step 599, the composite inner skin may first have been molded on the tool, the sectors retracted and the composite inner skin removed from the tool, and only then subsequently repositioned on the tool. Next, in step 604, the acoustic core (e.g., honeycomb core typically used in engine nacelles) is positioned over the composite inner skin and bonded thereto. After this, in step 606, the outer skin is positioned over the acoustic core and bonded thereto. Finally, in step 608, the bonded inner skin/core/outer skin assembly is removed from the tool. People skilled in the art understand how to bond adjacent layers for such an acoustic liner.

In the foregoing discussion, the tool 100 was suitable for making a composite tubular structure. It is understood, however, that certain features disclosed herein may also be used in conjunction with tools for making composite non-tubular structures. Thus, features such as the air bearings, the splice plates, the notches, the removable hand wheel and shaft, and the vacuum bags, among others, may find use in other tool settings where two sectors, at least one of which is movable relative to the other, has a joint formed therebetween.

While the present invention has been described herein above in connection with a plurality of aspects and embodiments, it is understood that these aspects and embodiments were presented by way of example with no intention of limiting the invention. Accordingly, the present invention should not be limited to any specific embodiment or aspect, but rather construed in breadth and broad scope in accordance with the recitation of the claims appended hereto.

What is claimed is:

1. A tool for making a composite tubular structure, the tool being adjustable between a molding position and a non-molding position, the tool comprising:
a base; and
a plurality of sectors mounted on the base, the plurality of sectors including at least one fixed sector that is fixed relative to the base and at least two movable sectors, each of the movable sectors being movable in a radial direction with respect to the base and the fixed sector, wherein:
in the molding position, first and second movable sectors are in a radially outward position of the base and adjacent to side edges of the fixed sector; and
in the non-molding position, the first and second movable sectors are in a radially inward position of the base and radially spaced from side edges of the fixed sector.

2. The tool according to claim 1, further comprising splice plates positioned between adjacent sectors, when the tool is in the molding position.

3. The tool according to claim 2, wherein the splice plates have a T-shaped cross-section.

4. The tool according to claim 2, wherein the splice plates maintain alignment of adjacent sectors.

5. The tool according to claim 2, wherein outer surfaces of the splice plates form a portion of an outer contour of the tool and maintain a maximum step difference along side edges of adjacent sectors that is less than 0.05 inches.

6. The tool according to claim 1, wherein each of the movable sectors rests on at least one air bearing to facilitate movement in said radial direction.

7. The tool according to claim 6, wherein the at least one air bearing comprises a flat portion of a movable sector.

8. The tool according to claim 6, further comprising a nozzle attached to said movable sector and connectable to a compressed air source to thereby supply air to said at least one air bearing.

9. The tool according to claim 1, further comprising at least one removable hand wheel operatively connected to a corresponding removable shaft, wherein turning the hand wheel moves a corresponding sector in the radial direction.

10. The tool according to claim 9, wherein the at least one removable hand wheel and the removable shaft are mounted on separate hinged blocks.

11. The tool according to claim 10, wherein the sectors and the hinged blocks are made from a same material.

12. The tool according to claim 1, comprising a pair of cutouts formed in the upper facing corners of adjacent sectors, the cutouts cooperating to form a notch, when the tool is in the molding position.

13. The tool according to claim 1, comprising a total of four sectors, one fixed sector and three movable sectors.

14. A tool for making a composite tubular structure, the tool being adjustable between a molding position and a non-molding position, the tool comprising:

a base;

a plurality of sectors mounted on the base, the plurality of sectors including at least one fixed sector that is fixed relative to the base and at least two movable sectors;

each of the movable sectors being movable in a radial direction with respect to the base and the fixed sector; wherein:

in the molding position, first and second movable sectors are in a radially outward position of the base and adjacent to side edges of the fixed sector; and in the non-molding position, the first and second movable sectors are in a radially inward position of the base and radially spaced from side edges of the fixed sector; and each of the movable sectors resting on at least one air bearing to facilitate movement along an upper surface of said base; and each of the movable sectors being operatively connected to a removable hand wheel operatively connected to a corresponding removable shaft, wherein turning the hand wheel moves a corresponding sector; and a plurality of splice plates, each splice plate positioned between adjacent sectors, when the tool is in the molding position.

15. A tool for making a composite tubular structure, the tool being adjustable between a molding position and a non-molding position, the tool comprising:

a base;

a plurality of sectors mounted on the base, the plurality of sectors including at least one fixed sector that is fixed relative to the base and at least two movable sectors; and a plurality of splice plates, each splice plate positioned between adjacent sectors and secured thereto with a plurality of bolts, each bolt passing though a portion of said each splice plate and also a portion of each of said adjacent sectors, when the tool is in the molding position.

* * * * *